United States Patent
Gerber et al.

(10) Patent No.: US 12,473,953 B2
(45) Date of Patent: Nov. 18, 2025

(54) BRAKING SYSTEM WITH THREADED CONNECTION

(71) Applicant: ZF Active Safety US Inc., Livonia, MI (US)

(72) Inventors: Kraig Gerber, Plymouth Township, MI (US); Galus Chelaidite, South Lyon, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 568 days.

(21) Appl. No.: 17/939,059

(22) Filed: Sep. 7, 2022

(65) Prior Publication Data

US 2024/0077122 A1    Mar. 7, 2024

(51) Int. Cl.
| F16D 65/56 | (2006.01) |
| F16D 65/18 | (2006.01) |
| F16D 121/04 | (2012.01) |
| F16D 125/36 | (2012.01) |

(52) U.S. Cl.
CPC .......... F16D 65/18 (2013.01); *F16D 2121/04* (2013.01); *F16D 2125/36* (2013.01)

(58) Field of Classification Search
CPC ...... F16D 65/18; F16D 65/567; F16D 65/568; F16D 2125/40; F16D 2125/405; B60T 13/741
See application file for complete search history.

(56) References Cited

U.S. PATENT DOCUMENTS

| 4,917,220 A | * | 4/1990 | Ikegami | F16D 65/18 188/71.9 |
| 5,219,047 A | * | 6/1993 | Fouilleux | F16D 65/567 188/71.9 |
| 6,659,236 B1 | * | 12/2003 | Clark | F16D 65/567 188/79.51 |
| 9,353,811 B2 | | 5/2016 | Gutelius et al. | |
| 2003/0042084 A1 | * | 3/2003 | Kawase | F16D 55/00 188/72.1 |
| 2007/0158148 A1 | * | 7/2007 | Ohtani | F16D 65/18 188/158 |
| 2011/0017553 A1 | * | 1/2011 | Maehara | F16D 65/568 188/71.9 |
| 2015/0129371 A1 | * | 5/2015 | Gutelius | F16D 55/228 188/72.1 |
| 2015/0323026 A1 | * | 11/2015 | Yasui | F16H 25/186 74/89 |
| 2015/0362033 A1 | * | 12/2015 | Yasui | F16D 65/18 188/72.8 |
| 2017/0370453 A1 | * | 12/2017 | Suzuki | F16D 65/22 |

(Continued)

*Primary Examiner* — Nicholas J Lane
(74) *Attorney, Agent, or Firm* — Tarolli, Sundheim, Covell & Tummino LLP

(57) ABSTRACT

A brake system is provided for a wheel rotor having a brake pad associated therewith. The brake system includes a housing defining first and second passages. First and second pistons are provided in the respective first and second passages for selectively moving the brake pad into engagement with the wheel rotor. First and second spindles are threadably coupled to the first and second pistons such that the pistons are axially movable relative to the spindles without the spindles rotating. Each spindle includes first threads separated by first cylindrical roots and each piston is coupled to second threads separated by second cylindrical roots.

12 Claims, 15 Drawing Sheets

(56) References Cited

U.S. PATENT DOCUMENTS

| | | | |
|---|---|---|---|
| 2018/0087590 A1* | 3/2018 | Chelaidite | F16D 55/226 |
| 2018/0231081 A1* | 8/2018 | Chelaidite | F16D 65/183 |
| 2019/0056006 A1* | 2/2019 | Chelaidite | F16D 65/18 |
| 2020/0096067 A1* | 3/2020 | Boyle | F16D 65/0971 |
| 2021/0001826 A1* | 1/2021 | Gerber | B60T 13/741 |
| 2023/0003270 A1* | 1/2023 | Peric | F16D 65/18 |

* cited by examiner

BRAKING SYSTEM WITH THREADED CONNECTION

TECHNICAL FIELD

The present invention relates to braking systems and, in particular, relates to a braking system having pistons that are axially movable relative to spindles during the apply and release phases of a braking operation.

BACKGROUND

Current vehicles are equipped with hydraulic service brakes and electric parking brakes (EPB) for helping control vehicle braking depending on predetermined scenarios. The service brakes rely on one or more movable pistons that selectively apply force to brake pads in order to slow down or stop rotating wheel rotors on the vehicle. The EPB can be used to, for example, supplement the service braking and/or maintain the vehicle at a standstill on a hill.

SUMMARY

In one example, a brake system is provided for a wheel rotor having a brake pad associated therewith. The brake system includes a housing defining adjacent first and second passages. First and second pistons are provided in the respective first and second passages for selectively moving the brake pad into engagement with the wheel rotor. First and second spindles are threadably coupled to the first and second pistons such that the pistons are axially movable relative to the spindles without the spindles rotating. Each spindle includes first threads separated by first cylindrical roots and each piston is coupled to second threads separated by second cylindrical roots In another example, a brake system is provided for a wheel rotor having brake pads associated therewith. The brake system includes a housing defining adjacent first and second passages. First and second pistons are provided in the respective first and second passages for selectively moving a brake pad into engagement with the wheel rotor. Each of the first and second pistons is associated with first threads separated by first cylindrical roots. First and second spindles each having second threads separated by second cylindrical roots and threadably engaged with the first threads associated with the respective first and second pistons such that the threads are axially movable along the opposing roots to allow the pistons to move axially relative to the respective spindles without the spindle rotating. First and second adapters are coupled to the first and second spindles by respective clutch mechanisms. The clutch mechanisms have an engaged condition for transferring torque from the adaptors to the spindles and a disengaged condition allowing for relative rotation between each spindle and the associated adapter such that the spindle rotates when the piston moves axially relative to the spindle beyond a predetermined amount.

Other objects and advantages and a fuller understanding of the invention will be had from the following detailed description and the accompanying drawings.

DETAILED DESCRIPTION

Figure 1:
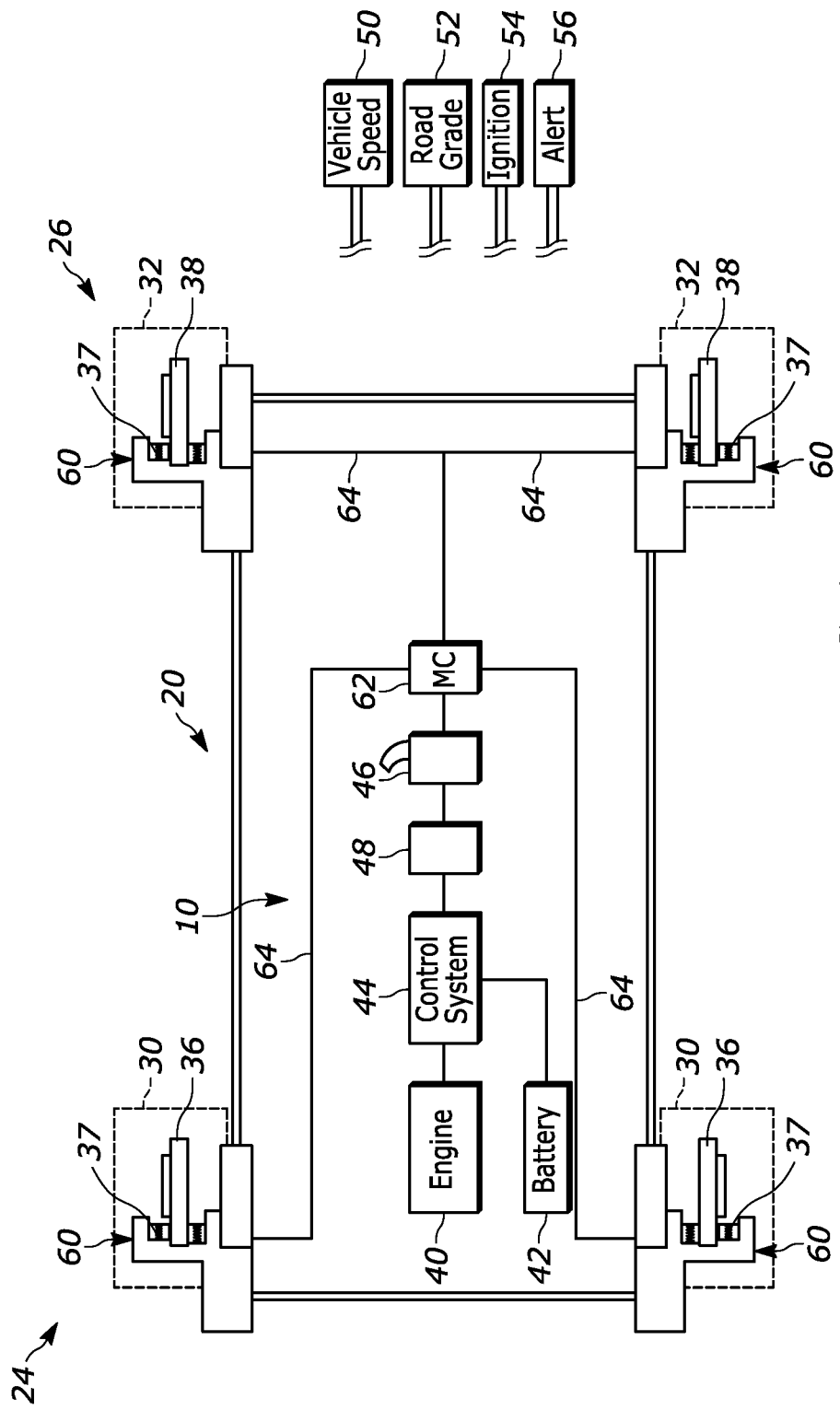
FIG. 1 is a schematic illustration of a vehicle having a braking system including an example caliper assembly.
Figure 2:
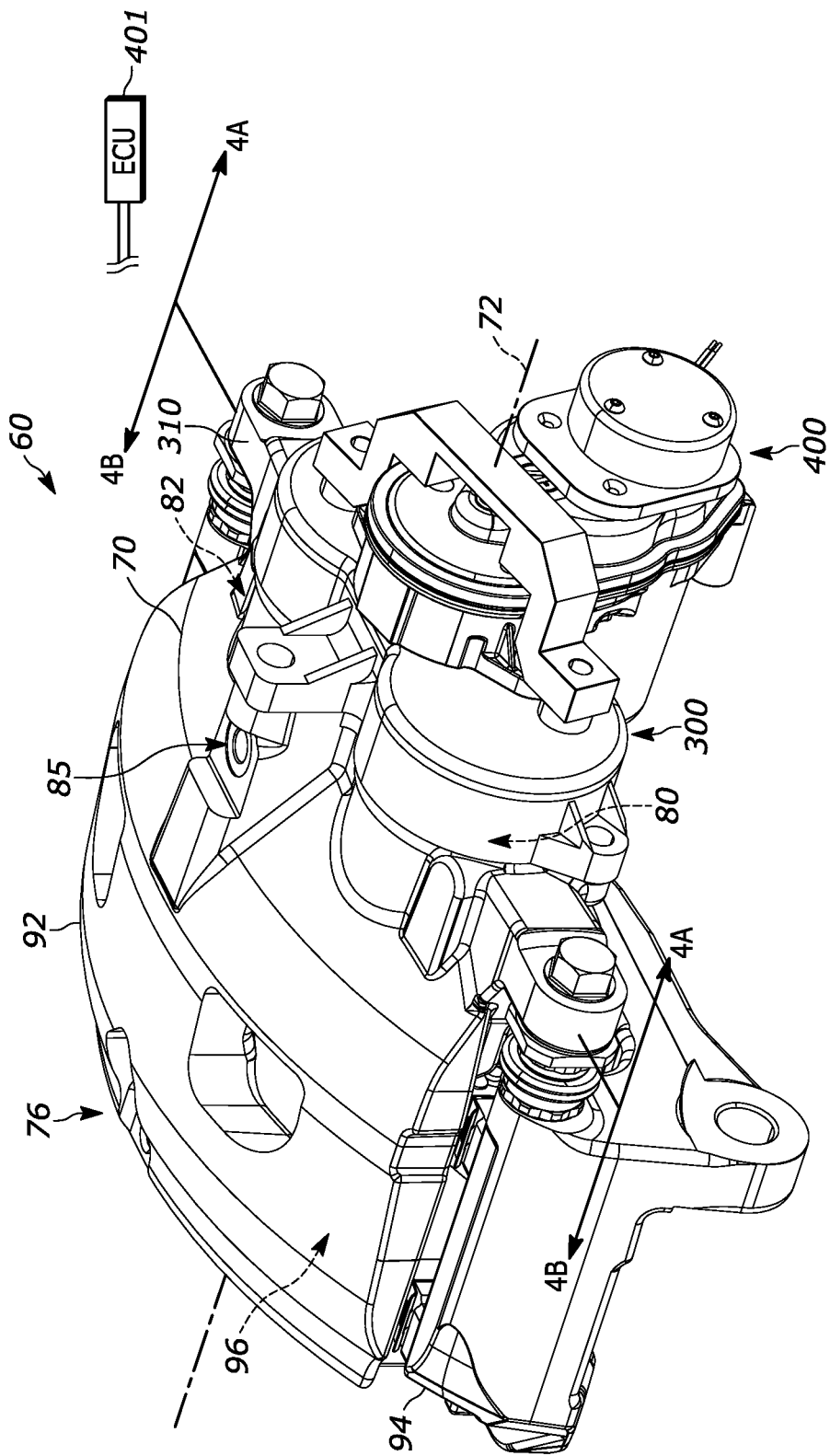
FIG. 2 is a side view of the caliper assembly.

The present invention relates to braking systems and, in particular, relates to a braking system having pistons that axially movable relative to spindles during the apply and release phases of a braking operation. FIG. 1 illustrates an example braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven by a powertrain axle (not shown) and steered by a steering linkage (not shown). A pair of wheels 32 is provided at the rear end 26. Each wheel 32 includes a wheel rotor 38 driven by a powertrain axle (not shown) and, rarely, steered by a steering linkage (not shown). Friction brake pads 37 are associated with each wheel rotor 36, 38 and positioned on opposite sides thereof.

A propulsion system 40 including an engine and/or electric motor supplies torque to the wheels rotors 36 and/or the wheels rotors 38 via powertrain front and rear axles (not shown). A battery 42 supplies power to the vehicle 20. A brake pedal simulator 46 or brake pedal (not shown) is provided for controlling the timing and level of vehicle 20 braking. A sensor 48 is connected to the brake pedal simulator 46 and monitors the displacement and acceleration of the brake pedal simulator.

A caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. It will be appreciated, however, that, on certain vehicles (20), only the front wheel rotors 36 or only the rear wheel rotors 38 can include a caliper assembly 60 (not shown). The caliper assemblies 60 are connected to a master cylinder 62 by hydraulic lines 64.

It will be appreciated that the fluid system for the caliper assemblies 60 and master cylinder 62 has been greatly simplified for brevity.

A control system 44 is provided for helping control operation of the vehicle 20, such as operation of the propulsion system 40 and vehicle braking, including operating the caliper assemblies 60. To this end, the control system 44 can include one or more controllers, such as a transmission controller, propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of when the ignition is turned on and off. The control system 44 can receive and interpret these signals and perform vehicle functions, e.g., braking, in response thereto. The control system 44 can also be connected to an alert 56 for notifying the driver/operator of the vehicle 20 of vehicle conditions, vehicle status, and/or environmental conditions.

Referring to FIGS. 2, 3, 4A and 4B, the caliper assembly 60 includes a housing 70 and a gear stage assembly 300 connected to the housing. The housing 70 extends generally along a centerline 72 from a first end 74 to a second end 76. First and second bores or passages 80, 82 (see FIGS. 4A-4B) extend into the housing 70 and parallel to the centerline 72. A passage 84 fluidly connects the first and second passages 80, 82. An inlet opening 85 extends into the housing 70 to the connecting passage 84. The inlet opening 85 is configured to receive hydraulic fluid from the hydraulic lines 64. An annular recess or seal groove 86 is provided in each passage 80, 82. A cover or end cap 87 on the first end 74 extends over and obstructs the passages 80, 82. The end cap 87 can be integrally formed with or a separate component connected to the first end 74. Openings 88, 90 extend through the end cap 87 and to the respective passages 80, 82.

A bridge 92 extends from the second end 74 of the housing 70 and along/parallel to the centerline 72. A projection 94 extends from the bridge 92 and transverse to the centerline 72. The bridge 92 and projection 94 cooperate to define a channel 96 for receiving the rotor 36 or 38 of one of the wheels 30 or 32.

Referring to FIGS. 5-8, a piston assembly 100 is provided in each passage 80, 82 in the housing 70. The piston assembly 100 includes a piston 102 extending along a centerline 104 from a first end 106 to a second end 108 (see FIG. 8). A first passage 110 extends from the first end 104 towards the second end 108 and terminates at an axial end surface 112. A second passage extends 114 from the end surface 110 towards the second end 108 and terminates at an axial end surface 116. A first annular recess 120 is provided in the first passage 110 and encircles the centerline 104. A second annular recess 122 is provided on the exterior of the piston 102 at the second end 108 thereof. The piston 102 is formed from a material that is durable in both compression and tension, such as steel, aluminum or the like.

The piston assembly 100 further includes an annular, stationary ramp 130. A central passage 132 extends through the ramp 130. An annular track 134 encircles the central passage 132 and includes a series of ramps symmetrically arranged about the central passage. A bearing cage 150 (FIG. 6) is aligned with the annular track 134 and includes a central passage 152 and pockets 154 arranged around the central passage for receiving roller bearings 140. In this example, the roller bearings 140 are spherical and extend to both sides of the bearing cage 150.

Figure 10:
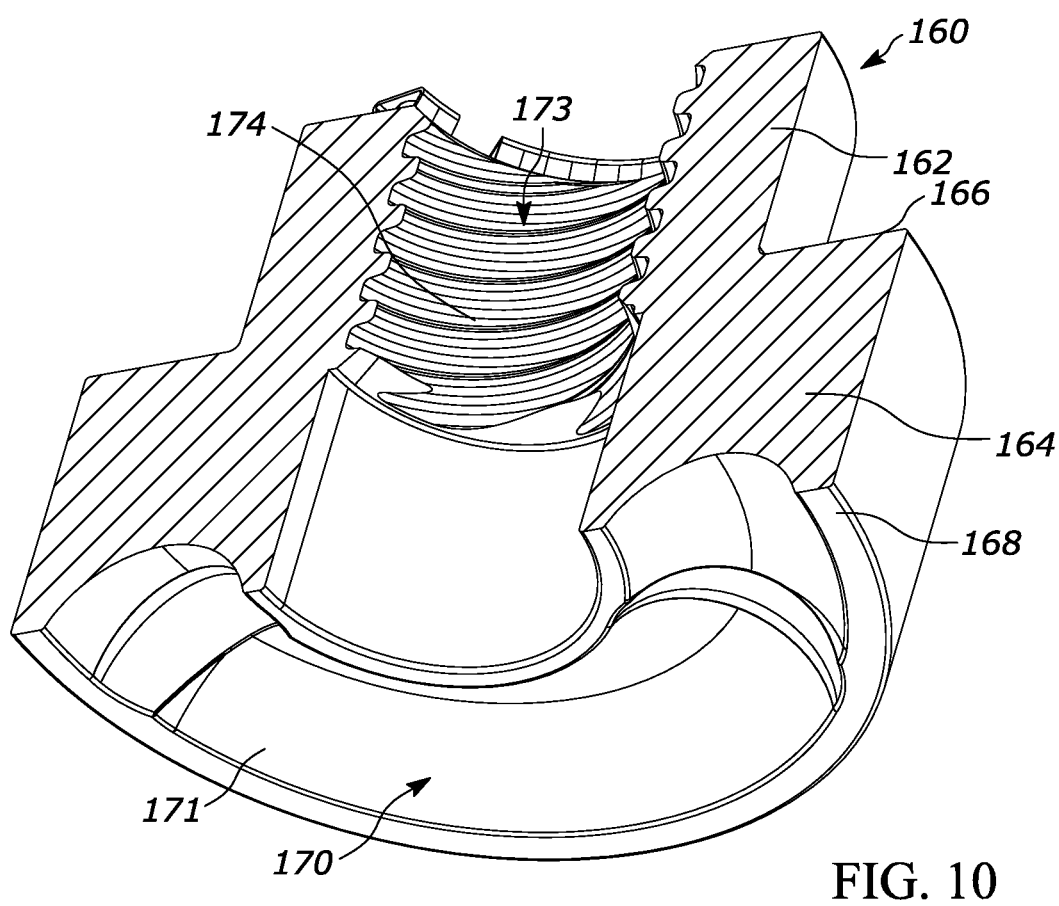
FIG. 10 is a section view of a ramp nut of the caliper assembly.

A ball ramp assembly including a ramp nut 160 (FIG. 10) is provided in the first passage 110 of the piston 102. The nut 160 includes a base 162 and a flange 164 extending radially outward from the base. The flange 164 includes a first axial end surface 166 and a second axial end surface 168. A central passage 173 extends the entire length of the ramp nut 160 through the base 162 and the flange 164. An angled radial track 170 is formed in the second axial end surface 168 and includes a series of ramps 171 symmetrically arranged about the central passage 173. Threads 174 are provided along a portion of the central passage 173.

A spring 180 (FIG. 6) is also provided in the first passage 110 of the piston 102. The spring 180 includes first and second axial end surfaces 182, 184. An inner surface defines a central passage 188 extending the entire length of the spring 180 from the axial end surface 182 to the axial end surface 184.

Figure 5:
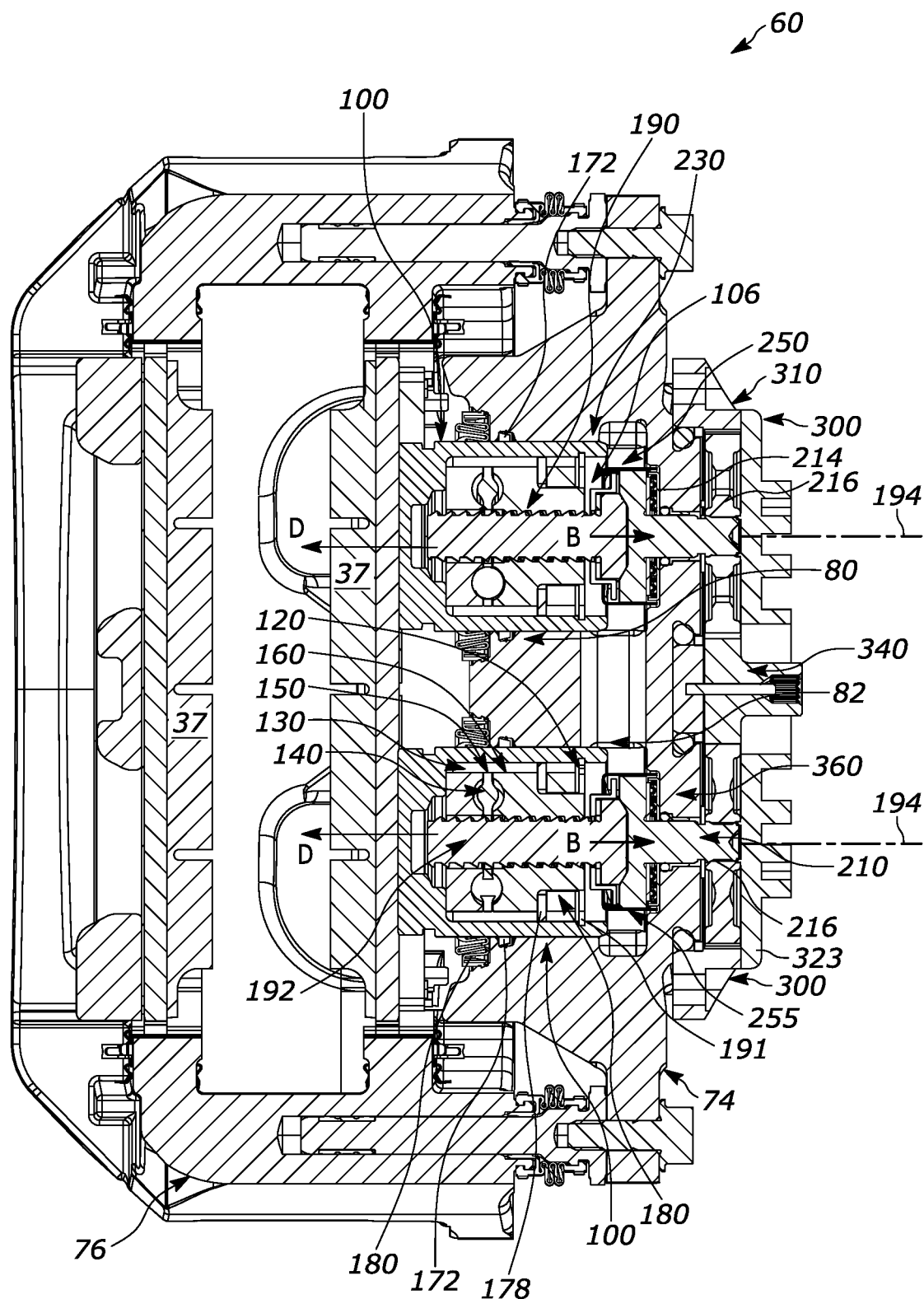
FIG. 5 is a section view taken along line 5-5 of FIG. 3.
Figure 6:
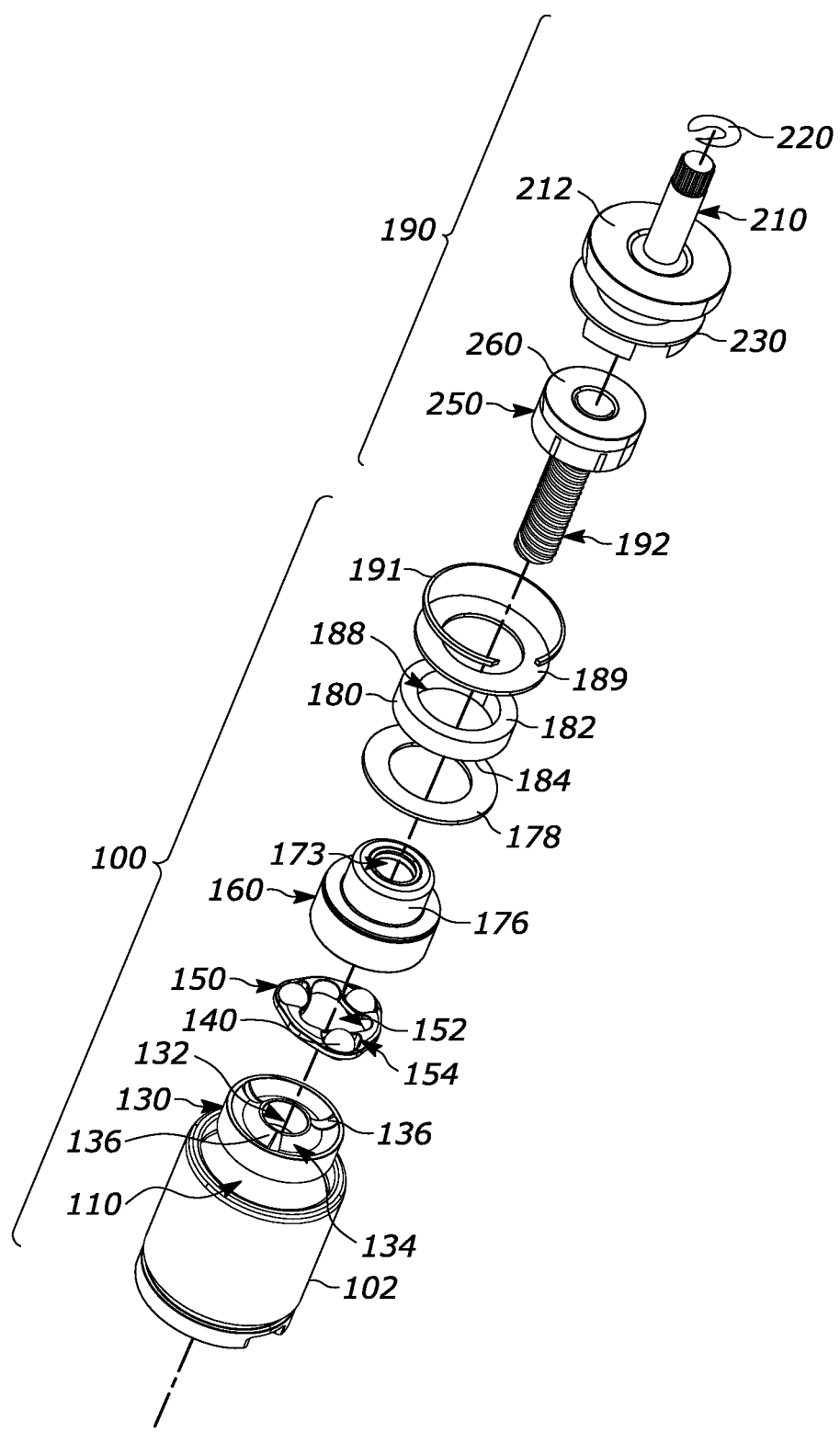
FIG. 6 is an exploded view of a portion of the caliper assembly.

Referring to FIGS. 5-6, the stationary ramp 130 abuts the end surface 112 in the piston 102. The roller bearings 140 are positioned in the annular track 134 of the stationary ramp 130 at the bottom of each ramp. The ramp nut 160 is positioned in the first passage 110. The roller bearings 140 are received in the annular track 170 at the bottom of each ramp 171 such that the roller bearings are movable along and relative to both the annular recess in the ramp nut 160 and the annular track 134 in the stationary ramp 130.

The base 162 of the ramp nut 160 extends through the central passage 188 in the spring 180 such that the end surface 184 of the spring is aligned with the end surface 166 of the flange 164 of the ramp nut. A thrust bearing 178 is positioned between and abuts the end surface 166 and the end surface 184.

A clip 191 forms a snap-fit with the annular recess 120 of the piston 102. The clip 191 is aligned with the end surface 182 of the spring 180. A washer 189 is positioned between and abuts the end surface 182 and the clip 191. The end surface 184 of the spring 180 abuts the thrust bearing 178 which subsequently abuts end surface 166 of the ramp nut 162. Due to the presence of the thrust bearing 178, the spring 180 urges or presses the ramp nut 160 against the roller bearings 140. Since the roller bearings 140 press against the stationary ramp 130, which presses against the piston 102, the roller bearings are held in place in the tracks 130, 170 and loaded up to a force equal to the pre-loaded (or compressed) spring 180.

A seal 172 extends around the exterior of the second end 108 of the piston 102. The piston boot excluder 180 is provided in the outer recess 122 and helps prevent dirt and debris from entering the passages 80, 82.

Figure 9:
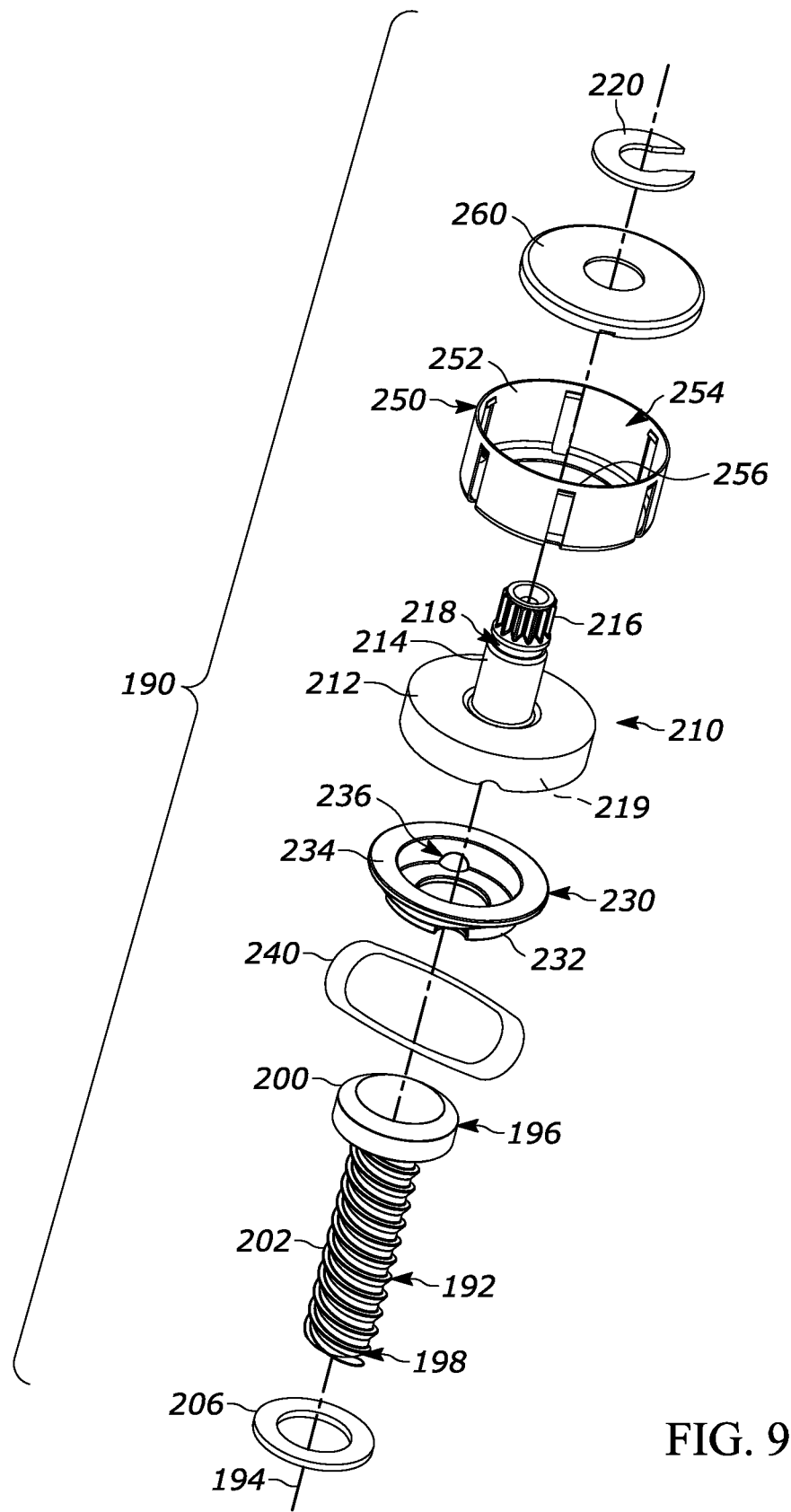
FIG. 9 is an exploded view of a spindle assembly.

A spindle assembly 190 extends through each piston assembly 100. As shown in FIG. 9, the spindle assembly 190 includes a spindle 192 extending along an axis 194 from a first end 196 to a second end 198. A projection or flange 200 extends radially from the spindle 192 to define the first end 196. External threads 202 are provided from the flange 200 to the extent of the second end 198. In one example, the extent of the flange 200 at the first end 196 is generally hemispherical.

The spindle assembly 190 further includes an annular bearing 206, an adapter 210, a bearing support member 230, a spring 240, and a clutch housing 250. The adapter 210 includes a base 212 and a projection 214 extending longitudinally therefrom. A splined portion 216 is formed at the end of the projection 214 opposite the base 212. An annular recess 218 is formed in the projection 214 adjacent the splined portion 216. A pocket or recess 219 is formed in the base 212 and is configured to receive the flange 200 at the first end 196 of the spindle 192. In one example, the recess 219 is substantially hemispherical. In other words, the first end 196 of the spindle 192 and the recess 219 cooperate to form a cooperating ball joint.

The bearing support member 230 includes a tubular base 232 and a flange 234 extending radially outward from the base. The base 232 and flange 234 cooperate to define a central passage 236. The spring 240 can be formed as, for example, a split wave spring.

The clutch housing 250 includes a tubular base 252 defining a central passage 254. An annular end wall 256 is provided at one end of the base 252 and partially obstructs the central passage 254. The spindle assembly 190 further includes a thrust bearing 260 and a retaining ring 218. The retaining ring 218 is configured to snap into the recess 218 on the projection 214 of the adapter 210.

Figure 7A:
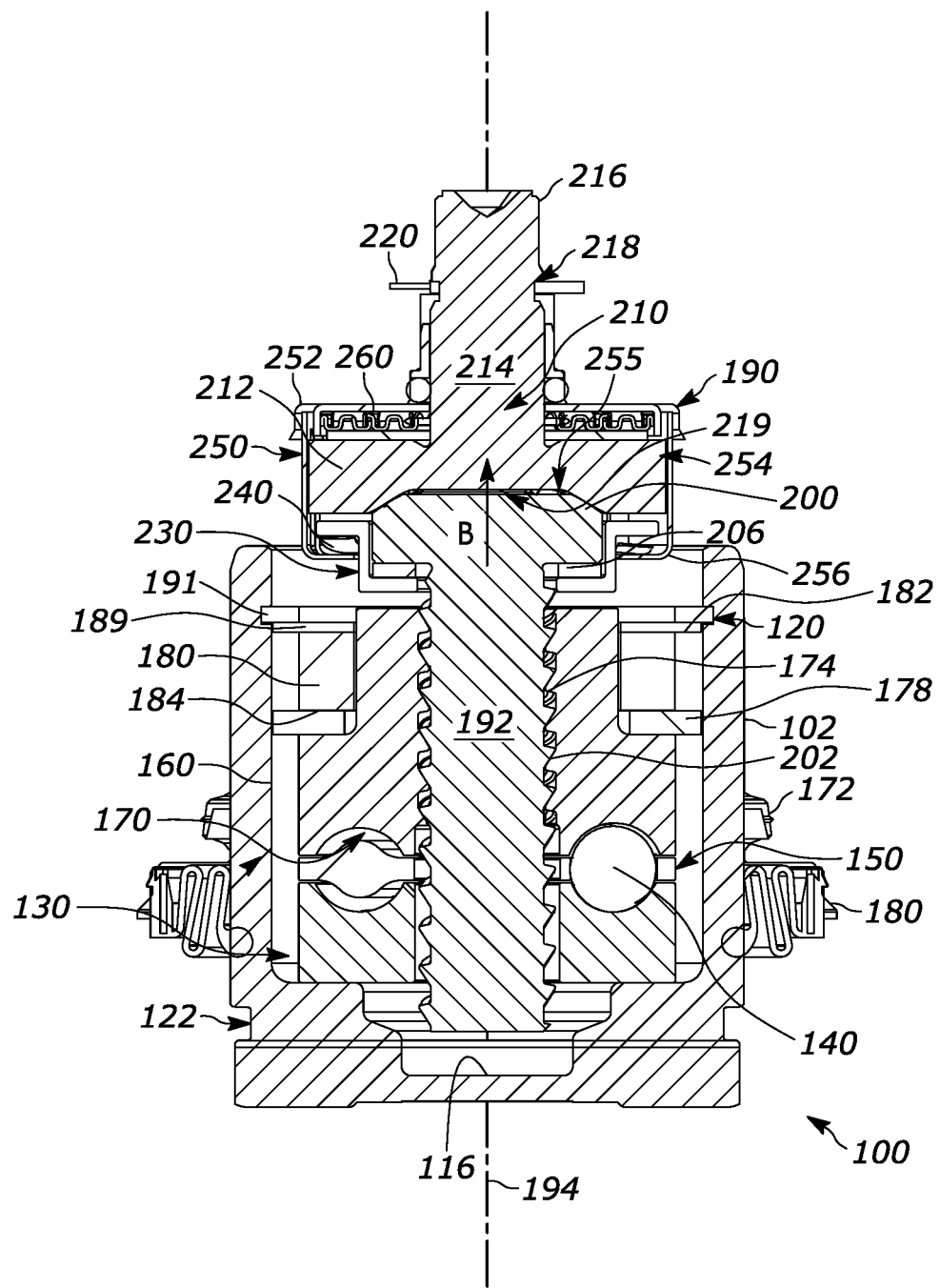
FIG. 7A is a section view of a piston assembly.

Referring to FIG. 7A, when the spindle assembly 190 is assembled, the flange 200 of the spindle 192 is received in the recess 219 of the adapter 210. The bearing 206 extends around the spindle 192 and abuts the flange 200. The flange 234 (see also FIG. 9) encircles the flange 200 on the spindle 192 such that the bearing 206 is positioned within the central passage 236 and sandwiched between the base 232 and the flange 200. The spring 240 extends around the exterior of the base 232 of the bearing support member 230 and is sandwiched between the end wall 256 of the clutch housing 250 and the flange 234 of the bearing support member 230.

Due to this configuration, the spring 240 biases the flange 234 of the bearing support member 230 towards the base 212 of the adapter 210. This likewise biases the base 232 of the bearing support member 230, the bearing 206, and flange 200 of the spindle 192 towards the base 212 of the adapter 210. Consequently, the flange 200 is biased into engagement with the recess 219 in the base 212 of the adapter 210 in the manner generally indicated at B.

In other words, the spring 240 not only axially biases the spindle 192 into engagement with the adapter 210 but also provides frictional resistance to rotation between the spindle and adapter. Consequently, torque applied to the spindle 192 below a predetermined amount will be insufficient to overcome the spring 240 bias (drag torque) and the spindle will therefore rotate with the adapter 210. On the other hand, torque applied to the spindle 192 at or above the predetermined amount will overcome the spring 240 bias (drag torque) and cause the flange 200 to rotate or slip relative to the adapter 210.

With this in mind, the bearing 206, spring 240, clutch retainer 230, and clutch housing 250 cooperate to define a clutch or clutch mechanism 255 acting between the spindle 192 and the adapter 210. Consequently, the spindle 192 and adapter 210 are coupled to one another in a manner that allows for selective rotation of the spindle relative to the adapter and about the axis 194, as will be discussed below.

The thrust bearing 260 extends around the projection 214 on the adapter 210 and abuts the base 210. The base 252 of the clutch housing 250 extends circumferentially around the thrust bearing 260.

The ball nut assemblies help to couple the spindle assemblies 190 to each respective piston assembly 100. More specifically, the spindle 192 extends through the clip 191 and passages 132, 152, 173, 188 and is threadably engaged with the threads 174 on the ramp nut 160. The second end 198 of the spindle 192 is aligned with and positioned adjacent to the axial end surface 116 of the piston 102.

It will be appreciated that the mating threads 174, 202 can be configured to be "fast lead" threads. That is to say, the threads 174, 202 can be configured to have mating fast-pitch constructions that facilitate relative rotational and translational movement between the ramp nut 160 and the spindle 192, which facilitates relative movement between the piston 102 and the spindle.

Figure 7B:
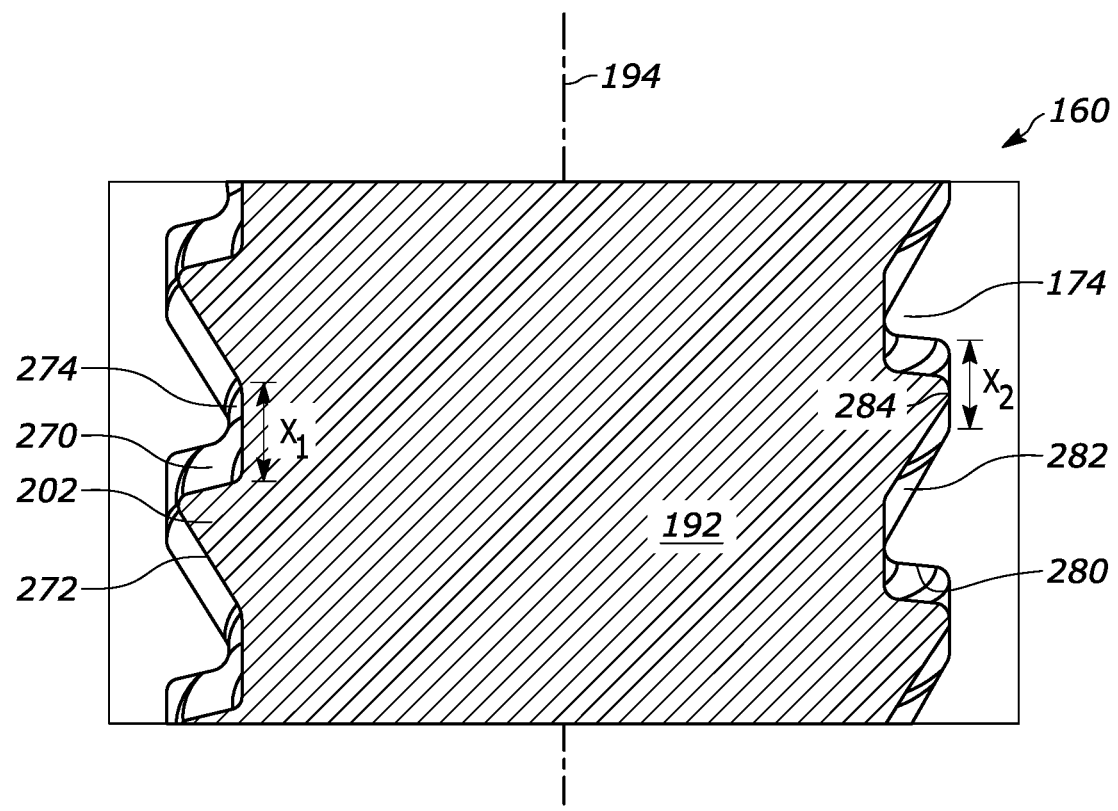
FIG. 7B is an enlarged view of a portion of FIG. 7A.
Figure 8:
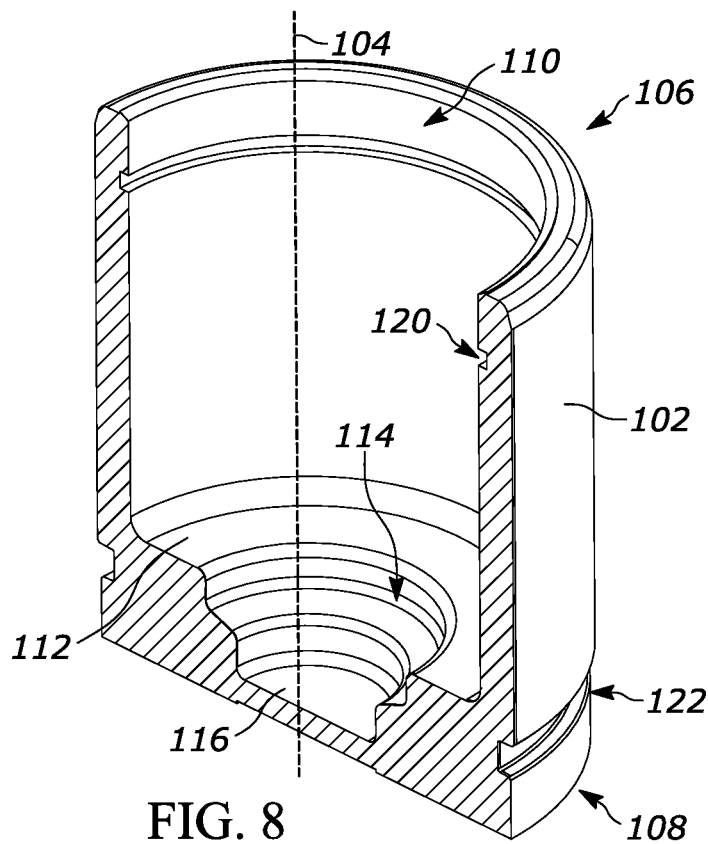
FIG. 8 is a section view of a piston of the piston assembly.

In one example, and referring to FIG. 7B, each thread 202 on the spindle 192 includes a first/high efficiency side 270 and a second/low efficiency side 272. Similarly, each thread 174 on the ramp nut 160 includes a first/high efficiency side 280 and a second/low efficiency side 282. The flank angles of the high efficiency sides 270, 280 are identical or substantially identical. The flank angles of the low efficiency sides 272, 282 are identical or substantially identical. For example, the high efficiency sides 270, 280 can each have a flank angle of about 10°. The low efficiency sides 272, 282 can each have a flank angle of about 58°. Greater or lesser flank angles in each instance are contemplated. In any case, the high efficiency sides 270, 280 confront one another and the low efficiency sides 272, 282 confront one another.

Each pair of adjacent threads 202 on the spindle 192 is separated by a root 274 extending generally parallel to the axis 194 and having a length along the axis indicated at $x_1$. Each pair of adjacent threads 174 on the ramp nut 160 is separated by a root 284 extending generally parallel to the axis 194 and having a length along the axis indicated at $x_2$. In other words, both of the roots 274, 284 are cylindrical surfaces centered about the axis 194. The lengths $x_1$, $x_2$ of the roots 274, 284 are identical or substantially identical. In one example, the lengths $x_1$, $x_2$ are on the order of about 1.5 to about 2.0 mm.

A piston assembly 100 and respective spindle 190 are provided in each of the passages 80, 82 in the housing 70. In particular, and referring back to FIG. 5, the first ends 106 of the pistons 102 are positioned closer to the first side 74 of the housing 70 while the second ends 108 are positioned closer to the second side 76. The seals 172 are positioned in the seal grooves 86 in the first and second passages 80, 82 and is configured to cooperate with the seal grooves to seal the piston 102 within the respective passage.

The splined portion 216 of one adapter 210 extends through the passage 80 and the associated opening 88 to the exterior of the housing 70. The splined portion 216 of another adapter 210 extends through the passage 82 and the associated opening 90 to the exterior of the housing 70. The thrust bearings 214 are provided on the unthreaded portions 204 and within the passages 80, 82 abutting the end cap 87. The retaining rings 220 are positioned in the annular recesses 218 and outside the end cap 87 of the housing 70 to axially fix the adapters 210 (and therefore the spindles 192 coupled thereto) in place.

Figure 11:
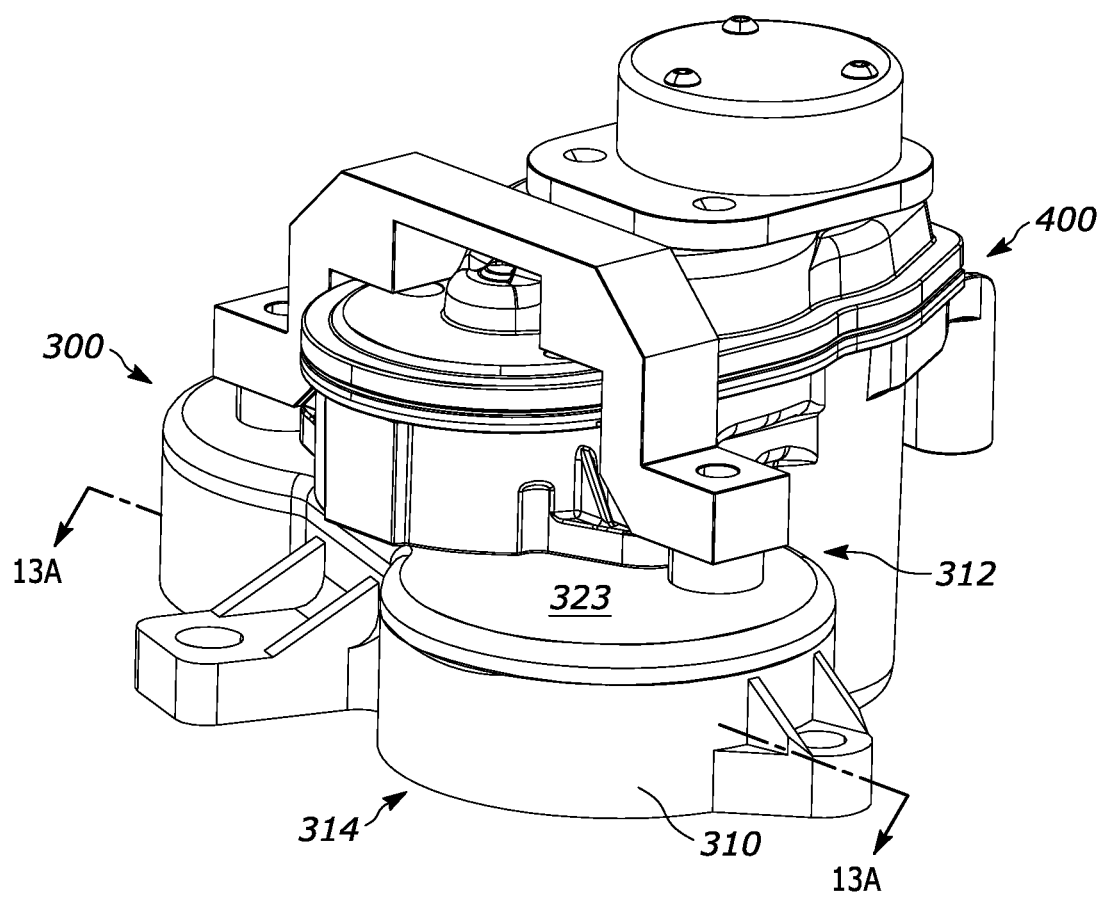
FIG. 11 is a front view of a gear stage assembly of the caliper assembly.
Figure 12:
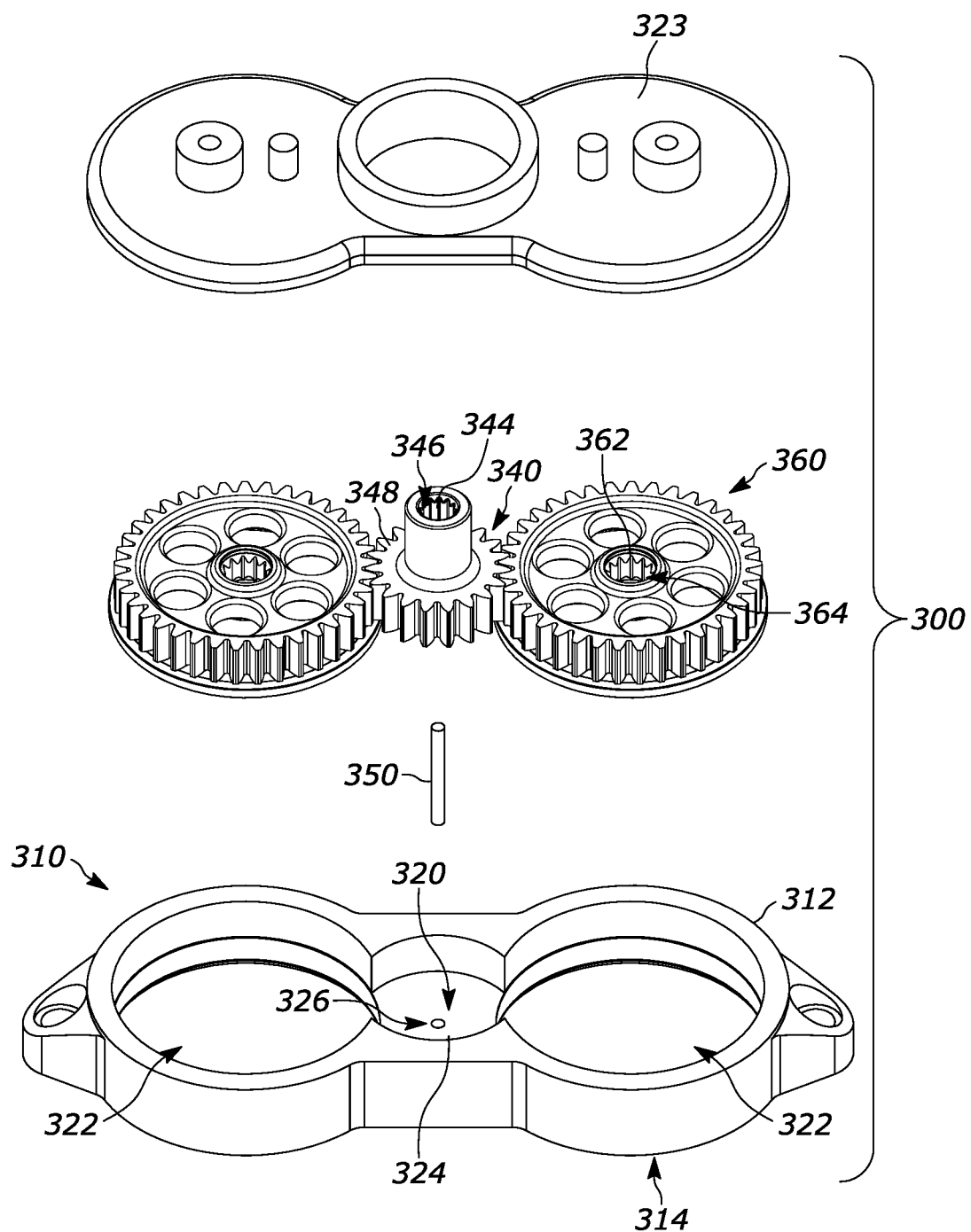
FIG. 12 is an exploded view of the gear stage assembly.

Turning to FIGS. 11-12, the gear stage assembly 300 is connected to a motor assembly 400. The gear stage assembly 300 and motor assembly 400 can be separate components coupled together (as shown) or integrally formed together in a single assembly (not shown). In any case, the gear stage assembly 300 is connected to the first end 74 of the housing 70 and includes a housing 310 having a first side 312 and a second side 314. A first passage 320 extends from the first side 312 towards the second side 314 and terminates at an axial end surface 324. An opening 326 extends into the end surface 324 towards the second side 314. A pair of second passages 322 extends entirely through the housing 310 and laterally intersect the first passage 320. A cap 323 closes the passages 322.

A drive gear 340 is provided within the first passage 320 and abuts the end surface 324. An inner surface 344 extends through the drive gear 340 and defines a splined passage 346 for connection to the motor assembly 400. An opening (not shown) extends from the passage 346 through the end of the drive gear 340. An axle 350 is received in the opening in the drive gear 340 and the opening 326 in the housing 310. Teeth 348 extend radially outward from the drive gear 340. The drive gear 340 is configured for rotation within first passage 320 relative to the housing 310.

Figure 13A:
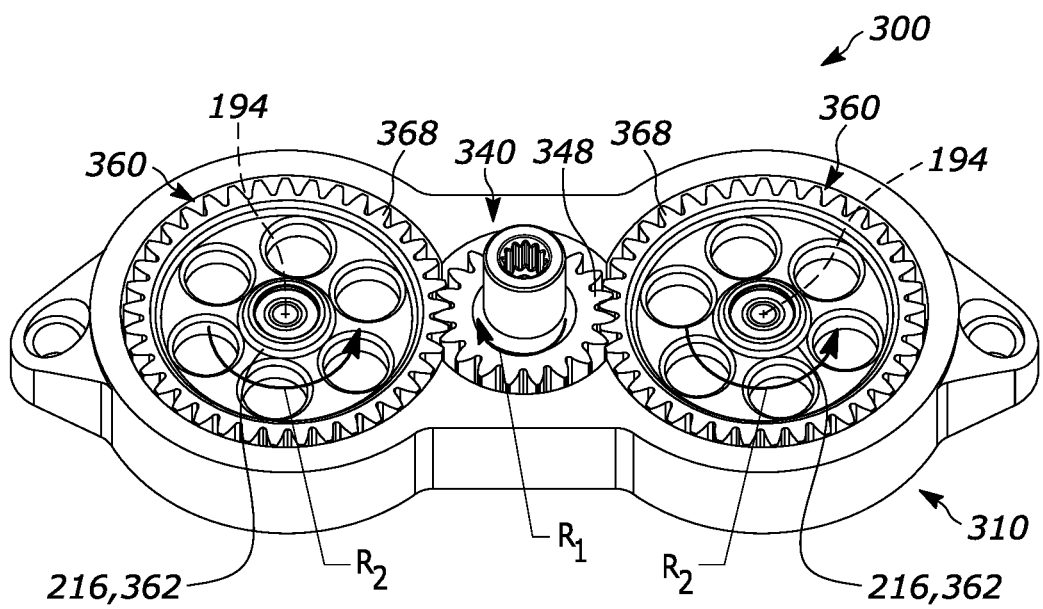
FIG. 13A is a top view of the gear stage assembly in a first condition

A pair of driven gears 360 is provided in the respective second passages 322. Each driven gear 360 includes an inner surface 362 defining a central passage 364 that is splined or otherwise configured to mate with the splined portion 216 of one of the adapters 210 to fix the driven gear and adapter for rotation together. In other words, each driven gear 360 rotatably connected to one of the respective adapters 210 associated with each piston assembly 100. Teeth 368 extend radially outward from each driven gear 360 and mesh with the teeth 348 on the drive gear 340. The gear stage assembly 300 is positioned over the exposed, splined portions 216 of the adapters 210 such that the splined inner surfaces 362 of the driven gears 360 mesh with the splined portions of the adapters (FIG. 13A).

The motor assembly 400 is coupled to the splined passage 346 of the drive gear 340 for selectively rotating the same. To this end, the motor assembly 400 includes a motor and a solenoid brake, e.g., normally locked, spring loaded brake for selectively allowing and preventing rotation of the motor and gear stage assembly (not shown). That said, the gear stage assembly 300 is operable by the motor assembly 400 to rotate the adapters 210 and, thus, rotate the spindles 192 in multiple directions. In particular, the motor assembly 400 is actuatable to rotate the drive gear 340 in the direction $R_1$ (CW as shown in FIG. 13A). This causes the driven gears 360 to rotate in the direction $R_2$. Since the splined portions 216 of the adapters 210 are fixed for rotation with the driven gears 260, rotating the driven gears in the direction $R_2$ likewise causes the adapters to rotate in the direction $R_2$.

Figure 13B:
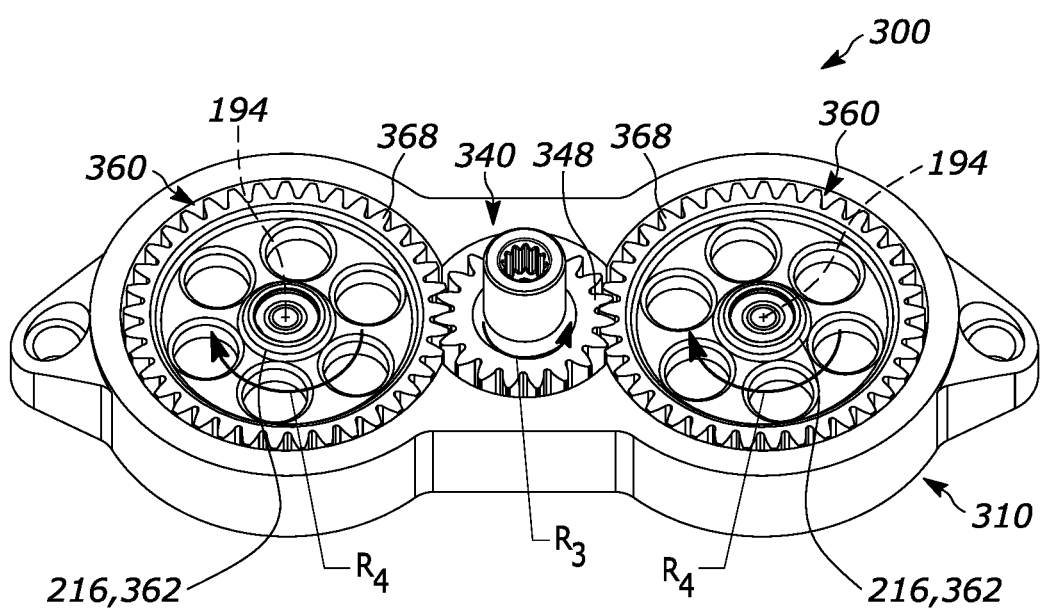
FIG. 13B is a top view of the gear stage assembly in a second condition.

The motor assembly 400 is also actuatable to rotate the drive gear 340 in the direction $R_3$ (CCW as shown in FIG. 13B). This causes the driven gears 360 to rotate in the direction $R_4$. Since the splined portions 216 of the adapters 210 are fixed for rotation with the driven gears 260, rotating the driven gears in the direction $R_4$ likewise causes the adapters to rotate in the direction $R_4$.

Returning to FIG. 5, during operation of the vehicle 20, the default condition is that the motor assembly 400 is unactuated and, thus, the gear stage assembly 300 does not rotate. Moreover, the solenoid brake is locked when the motor assembly 400 is unactuated, which thereby prevents the adapters 210 from rotating. With this in mind, when a service brake demand is initiated by the system and/or vehicle operator, hydraulic fluid is delivered via the hydraulic line 64 to the inlet opening 85 of the housing 70 of at least one caliper assembly 60. In this example, service braking is shown for a single wheel rotor 38 on the rear end 26.

The hydraulic fluid passes through the inlet opening 85, into the connecting passage 84, and subsequently into both the first and second passages 80, 82. The hydraulic fluid pressure builds within the passages 80, 82 and behind/upstream of the clips 191 in the passages 110 of the piston assemblies 100 until the fluid pressure is sufficient to urge the pistons 102 in the direction D towards the wheel rotor.

Figure 14A:
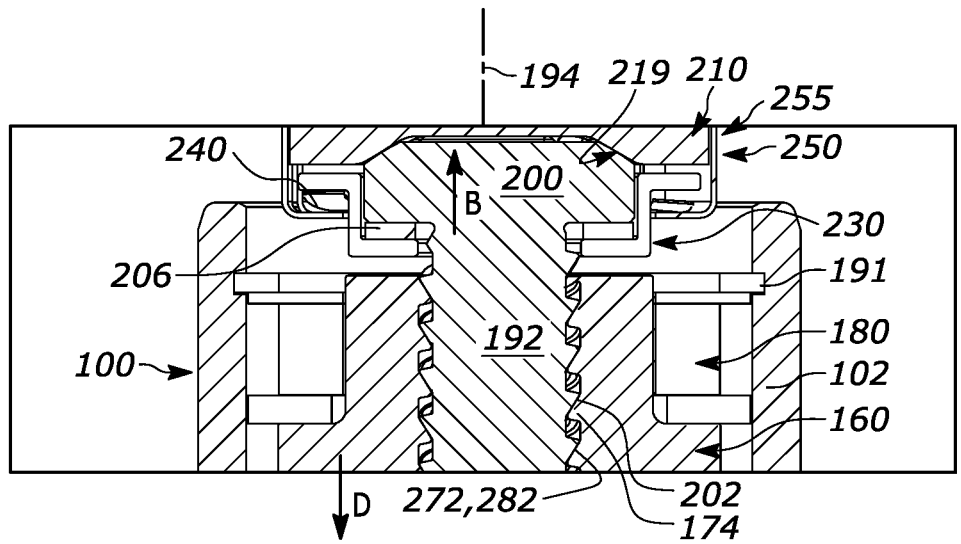
FIG. 14A is a schematic illustration of the piston assembly moving axially relative to the spindle assembly in a first braking condition.

As shown in FIG. 14A, when service braking begins, the low efficiency sides 272, 282 of the threads 174, 202 are initially engaged with one another. Fluid pressure acting on the clips 191 causes the piston assemblies 100 to move in the direction D, which allows each thread 174 to move axially relative the root 284 of the opposing thread 202 in the direction D. Since the threads 174, 202 advantageously do not engage one another, this axial movement does not apply torque to the spindle 192 and, thus, the spindle is stationary as the threads 174 move axially relative to the opposing roots 284.

Figure 14B:
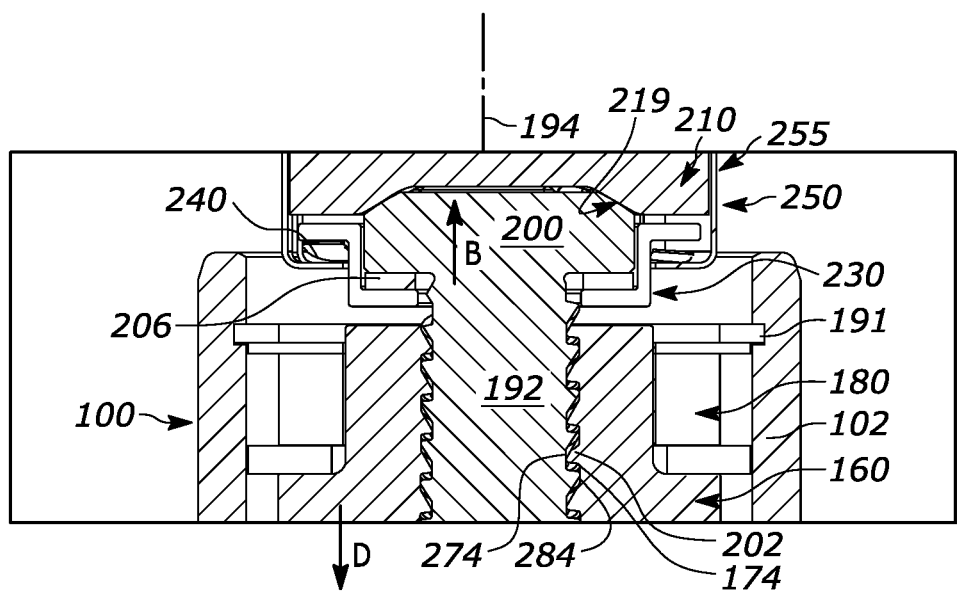
FIG. 14B is a schematic illustration of the piston assembly moving axially relative to the spindle assembly in a second braking condition.

When the degree of service brake demand is relatively low (FIG. 14B), the piston assemblies 100 are permitted to travel in the direction D until the pistons 102 engage with the brake pads 37 and apply braking force. This movement occurs while the spindles 192 remain stationary. In other words, the pistons 102 stop moving in the direction D at a position in which the low efficiency sides 272, 282 are spaced from one another and the high efficiency sides 270, 280 are spaced from one another. A substantially constant brake force is therefore applied by the hydraulically actuated pistons 102 to the brake pads 37, which brakes and/or stops the vehicle 20.

If the demand for service brakes is stopped, i.e., the brake pedal is released, hydraulic fluid is no longer supplied to the inlet openings 85. The hydraulic pressure therefore drops and, thus, the pistons 102 are no longer urged in the direction D towards the brake pad 37. This allows the elastically deformed bridge 92, housing 70, and pads 37 to automatically relax and push the pistons 102 back towards the respective passages 80, 82 in the direction opposite the direction D. More specifically, the threads 174 move axially relative the roots 284 of the opposing threads 202 in the direction opposite the direction D until the pistons 102 return to the axial positions along the spindles 192 shown in FIG. 14B.

During this time, the motor assembly 400 remains unactuated and the clutch mechanisms 255 between the spindles 192 and adapters 210 remain engaged and, thus, the spindles remain stationary while the pistons 102 return to their initial, pre-braking positions. The cylindrical configuration of the roots 274, 284 (see FIG. 7B) facilitates a rapid, unrestricted, retreat of the pistons 102 away from the brake pad 37.

As will be discussed, certain situations arise during service and EPB operations that cause the high efficiency sides 270, 280 to engage one another and cause the clutch mechanisms 255 to open, thereby allowing for relative rotation between the spindles 192 and respective adaptors 210. With this mind, and turning to FIG. 14C, the service brake demand in this situation is high enough to move the pistons 102 in the direction D relative to the spindles 192 sufficient to cause the high efficiency sides 270, 280 of the threads 174, 202 to engage one another. Additional movement of the pistons 102 in the direction D is therefore initially resisted.

As noted, each clutch mechanism 255 initially biases the spindle 192 into engagement with the adapter 210. To this end, the spring 240 not only axially biases the flange 200 into the recess 219 but also applies/supplies a drag torque therebetween. This drag torque provides a resistance to relative rotation between the spindle 192 and the adapter 210. With this in mind, the force applied by the piston assembly 100 to the spindle 192 as the piston 102 attempts to move in the direction D eventually applies enough torque to the spindle to exceed the drag torque.

More specifically, the piston 102 applies a force to retaining clip 191, which is transferred sequentially through the spring 180, to the bearing 178, to the ramp nut 160, and ultimately to the spindle 192 via the cooperating threads 174 of the ramp nut and the threads 202 of the spindle 192. Due to the helical nature of threads 174, 202, the axial force from the hydraulically actuated piston 102 results in a force vector that imparts torque to the spindle 192 and the ramp nut 160. The clutch mechanism 255 has a resistive torque that reduces as the axial load to the spindle 192 increases. At the same time, the ramp nut 160 resists torque (preventing rotation) by the bearings 140 reacting against the home position in the ramps 136. This then transfers the torque to the stationary ramp 130, which transfers torque to the piston 102, which reacts that torque at the piston face to the brake pad 37 interface and the piston seal 172. As a result, each clutch mechanism 255 disengages to allow the spindle 192 to rotate in the manner $R_5$ relative to the piston and the adapter 210.

In other words, each spindle 192—now released from the adapter 210 by the disengaged clutch mechanism 255—rotates about its axis 194 or back-drives to allow the piston 102 to travel further in the direction D and thereby apply a larger braking force against the wheel rotor 38 via the brake pads 37. Consequently, the service brake is applied and the bridge 92 of the housing 70 elastically deforms in a known manner.

When the service brake demand is stopped and hydraulic fluid evacuated from the pistons 102, the pistons are no longer urged in the direction D. Consequently, the threads 174 move axially relative to the roots 284 of the opposing threads 202 in the direction opposite the direction D as the pistons 102 retreat to the position shown in FIG. 14B.

It is important to note that when the pistons 102 retreat in this scenario, they retreat relative to a rotated/back-driven spindle 192. In other words, in the higher service brake demand scenario the spindle 192 has different rotational positions about its axis 194 during the brake apply and retreat stages because the clutch mechanism 255 disengages. On the other hand, in the lower service brake demand scenario the spindle 192 maintains the same rotational position about its axis 194 during the brake apply and release stages because the clutch mechanism 255 remains engaged throughout.

With that said, when a subsequent service brake demand is requested, the spindles 192 are located in the same position as when the previous service brake demand was requested. In other words, if the previous service brake demand was large enough to disengage the clutch mechanisms 255 and rotate the spindles 192, the spindles start the next service brake application already in the rotated position. That said, the pistons 102 and spindles 192 start each service brake application in the same relative orientation, e.g., axial and rotational, respectively, as the release position from the previous service brake application.

Given this configuration, during service brake application the amount of service brake demand required to disengage each clutch mechanism 255 depends on how far the pistons 102 must travel axially relative to the spindles 102 from the previous return position of the pistons. For example, if the pistons 102 are returned to a position along the spindles 192 closer to that shown in FIG. 14A, a relatively greater subsequent service brake demand is required to engage the high efficiency sides 270, 280 and disengage the clutch mechanism 255. On the other hand, if the pistons 102 are returned to a position along the spindles 192 closer to that shown in FIG. 14B, a relatively lower subsequent service brake demand is required to engage the high efficiency sides 270, 280 and disengage the clutch mechanism 255.

It will be appreciated that in overcoming the drag torque the pistons 102 may also temporarily apply load on the spindles 192 through the interaction between the high efficiency sides 270 and 280, thereby urging the spindle into more contact with the bearing 206 and less in contact with the adapter 210 by reducing the load in the pockets 219. When the apply load is at or above a certain level, the torque reacted by the clutch mechanism 255 is less than the backdrive torque on the spindles 192, which causes the spindles to backdrive out of the way as the pistons 102 generate clamp force on the rotor 38 via the pads 37.

In both the low and high service brake demand scenarios, the pistons 102 can advantageously move in the direction D independent from one another because the clutch mechanisms 255 coupling each spindle 192 to the corresponding adapter 210 operate independent from one another. That said, when the brake pad 37 and/or rotor 38 becomes worn, a single service brake operation may cause one clutch mechanism 255 to disengage and allow for some first degree of rotation of that spindle 192, whereas the other clutch mechanism 255 may also disengage to allow for some second, different degree of rotation of the corresponding spindle 192. As a result, the pistons 102 can move different distances in the direction D to account for pad and/or rotor wear, thereby advantageously allowing for the relative thread clearance for each piston/spindle 102, 192 pair to be the same or substantially the same. Consequently, a generally uniform clamp load can be generated on the brake pads 37 during the mechanically actuated EPB operation.

In one instance, the piston 102 in the first passage 80 can move a first distance in the direction D before engaging the brake pad 37. If the brake pad 37 is worn, however, the piston 102 in the second passage 82 may be required to move a second, greater distance in the direction D before engaging the brake pad. Due to the independent clutch mechanisms 255, the piston 102 in the first passage 80 may move a small distance in the direction D sufficient to disengage the clutch mechanism 255 and rotate the spindle 192 some small amount. The piston 102 in the second passage 80, however, moves to a greater distance in the direction D to engage the spindle 192 sufficient to disengage the clutch mechanism 255 associated therewith and rotate the spindle 192 some greater amount. This enables the additional movement of the piston 102 to account for pad wear.

In each case, the fast lead connection 174, 202 facilitates rapid piston 102 movement in the direction D with little frictional resistance between the moving threads. Consequently, both pistons 102 will reach the brake pad 37 at substantially the same time regardless of any disparity in the degree of movement needed. With this in mind, it will be appreciated that the degree to which the pistons 102 can apply braking force to the brake pads 37 while the spindles 192 are stationary is dictated by the lengths $x_1$, $x_2$ of the roots 274, 284. Along the same lines, the lengths $x_1$, $x_2$ of the roots 274, 284 can be selected to prescribe a maximum degree of piston extension without disengaging the clutch mechanisms 255.

That said, independent clutch mechanisms 255 allow each spindle to "remember" that the brake pad 37 and/or rotor 38 are worn and thereby start subsequent braking operations with one or both spindles 192 starting in the back-driven position. This automatic adjustment of the caliper assembly 60 to account for pad wear advantageously allows the pistons 102 to retreat in an unrestricted manner while the spindles 192 are adjusted.

Figure 14C:
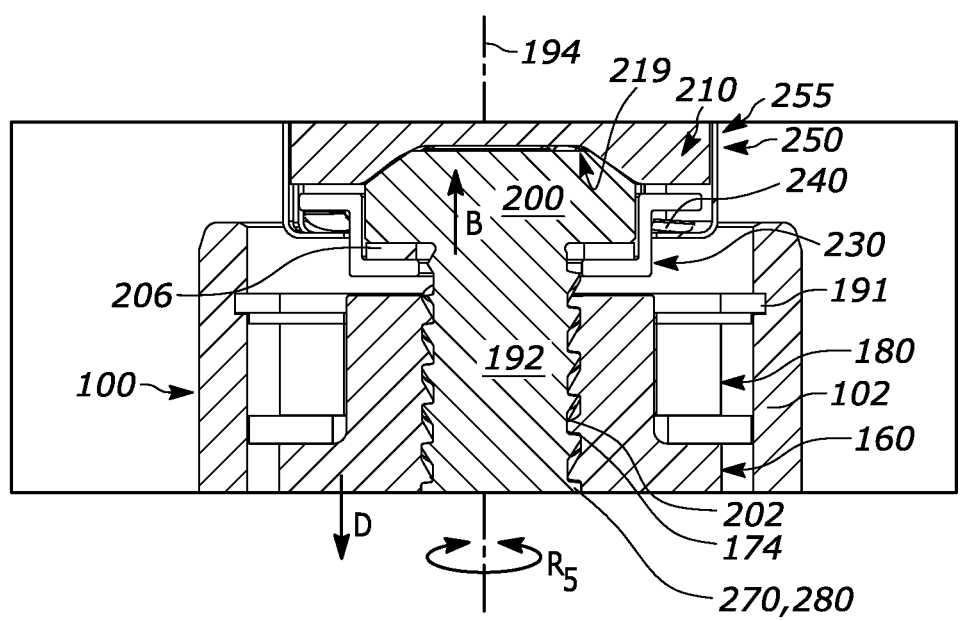
FIG. 14C is a schematic illustration of the piston assembly inducing rotation in the spindle assembly in a third braking condition.

When it is desirable to apply and maintain a parking brake on the wheel rotor 38 without hydraulic assistance, an ECU 401 (see FIG. 2) directs electrical power of polarity A to be applied to the motor assembly 400. This causes the solenoid brake therein to unlock to enable the drive gear 340 to rotate in the direction $R_1$ as shown in FIG. 13A, causing the adapters 210 to rotate with the driven gears 360 in the direction $R_2$. There is no counterforce to the biasing force B of the springs 240 at this time and, thus, the clutch mechanisms 255 between the spindles 192 and adapter 210 remains engaged. Accordingly, the spindles 192 rotate with the adapters 210 in the manner $R_5$ (FIG. 14C). In other words, the engaged clutch mechanisms 255 allow the adapters 210 to transfer torque to the spindles 192.

The spindles 192 rotate in the direction $R_5$ until the low efficiency sides 272 of the threads 270 on the spindles engage the low efficiency sides 282 of the threads 280 on the ramp nuts 160. The spindles 192 and ramp nuts 160 thereafter rotate together due to the threaded connection 174, 202 therebetween. The ramp 130, however, remains stationary.

That said, rotating the ramp nuts 160 relative to the stationary ramps 130 causes the roller bearings 140 to roll "up" the ramps 136, 171 in the respective tracks 134, 170. As a result, the ramp nut 160 in effect pushes the stationary nut 130 in the direction D through the roller bearings 140. The pistons 102 are therefore also moved in the direction D. In other words, while the spindles 192 continue rotating in the direction $R_5$, the pistons 102 and stationary ramps 130 connected thereto move in the direction D toward the brake pad 37 at low load. The combination of the piston 102 advancing in the direction D, coupled with the ramp nut 160 pushing the stationary nut 130 applies sufficient clamp force to the brake pads 37 to park the vehicle 20 without the need for assistance from the hydraulic brake system. The clutch mechanisms 255 remain engaged throughout this EPB apply operation.

When the ECU 401 detects sufficient current draw from the motor assembly 400, the ECU shuts off power to the motor assembly 400 which causes the solenoid brake therein to automatically lock, which locks the motor and gear train assembly 300 to prevent rotation of the adapters 210 and spindles 192 coupled thereto.

When it is desirable to release the parking brake, thereby allowing wheel rotor 38 to be able to rotate without frictional drag, electrical power of polarity opposite A is applied to motor assembly 400 causing the solenoid brake therein to unlock. The drive gear 340 is thereby allowed to rotate in the direction $R_3$, which causes the driven gears 360 to rotate in the direction $R_4$. Consequently, the adapters 210 rotate in the direction $R_4$ until the high efficiency sides 270 of the threads 202 engage the high efficiency sides 280 of the threads 174.

When the high efficiency sides 270, 280 of the threads 174, 202 contact each other, and when the reaction force at the pistons 102 interface with piston seals 172 reaches or exceeds a predetermined amount, e.g., about 40N to about 55N, the reaction force is sufficient to overcome the drag torque of the clutch mechanisms 255. This allows the spindles 192 to cease rotation while the adapters 210 continue to rotate in the direction $R_5$ for some pre-determined amount of time specified in the software controlling the ECU 401 when power is turned off.

In one instance, the pistons 102 can be returned during full EPB release to an axial position along the respective spindles 192 approximating the positions shown in FIG. 14C, i.e., the high efficiency sides 270, 280 to engage one another. That said, any subsequent service brake demand will be sufficient to disengage the clutch mechanisms 255 and cause the spindles 192 to rotate out of the way/be back-driven.

The motor assembly 400 is actuated during the EPB release phase for a time sufficient to reset the positions of the spindles 192 relative to the ramp nuts 130 and for the high efficiency sides 270 and 280 contact each other. Electrical power is then turned off, which causes the solenoid brake to automatically lock.

It will be appreciated that although the caliper assembly 60 shown and described as a dual piston assembly on a single side of the rotor, each respective caliper assembly can alternatively be configured as a single piston assembly. In such constructions, the motor assembly 400 would be modified accordingly.

Figure 3:
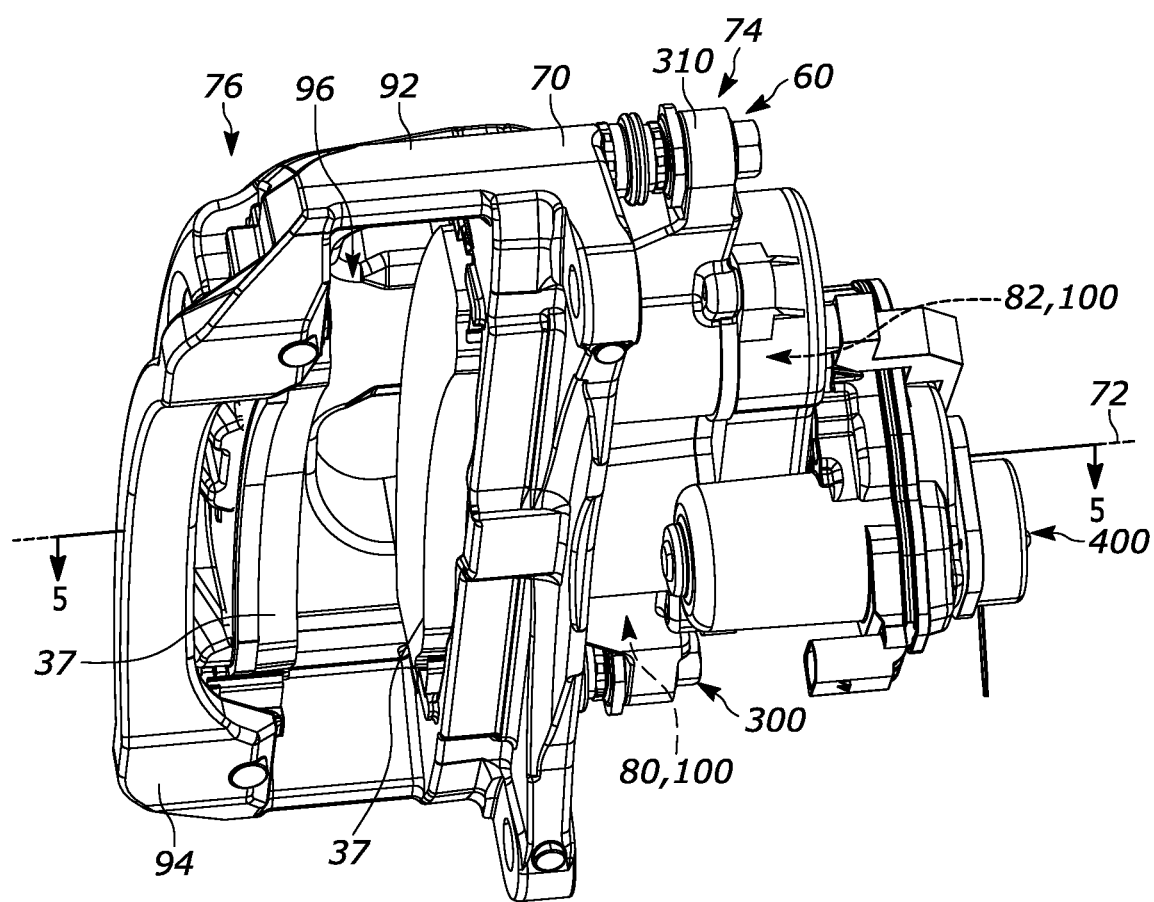
FIG. 3 is a bottom view of the caliper assembly.
Figure 4A:
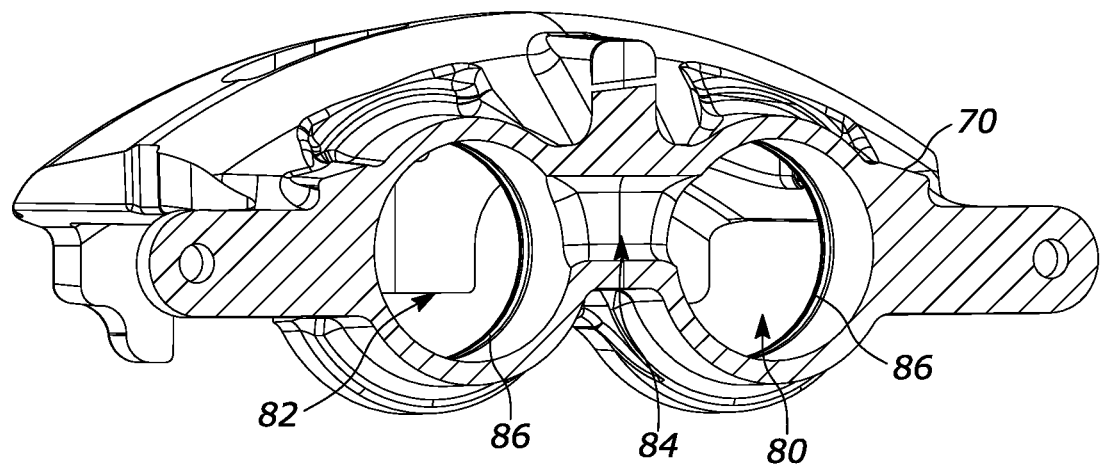
FIG. 4A is a section view taken along line 4A-4A of FIG. 2.
Figure 4B:
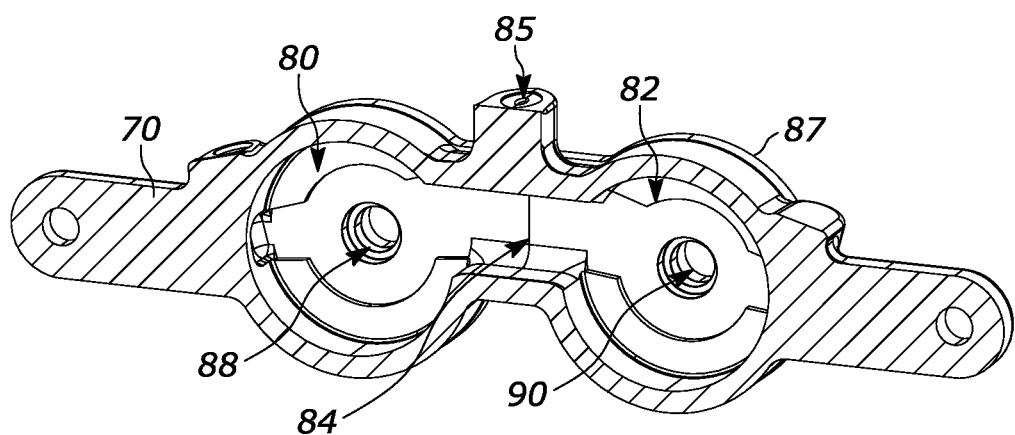
FIG. 4B is a section view taken along line 4B-4B of FIG. 2.

Moreover, one or more pistons 102 can be provided on the inboard side of the rotor 38 (as shown in FIG. 3), the outboard side of the rotor, or both sides of the rotor. A caliper assembly 60 can be associated with any number of these pistons 102. For example, caliper assemblies 60 can be provided on both sides of the rotor 38 of FIG. 3 and secured to one another such that the piston(s) 102 on opposite sides of the rotor oppose one another. That said, one or more pistons 102 can be provided on one or both sides of the rotor 38 and operate with an associated gear stage assembly as previously discussed. To this end, the spindle 192 and clutch mechanism 255 associated with each piston 102 operates independent from any other spindle, clutch mechanism, and piston combination on the rotor 38.

The caliper assembly shown and described herein can be used in different configurations within the vehicle 20 depending on several factors, including the type of vehicle in which braking is desired. For example, and referring back to FIG. 1, current, motor-driven EPB systems (not shown) might be used solely with the rear wheels 32 or on at least one front wheel 30. In accordance with the present invention, the caliper assembly can be provided for all four wheels 30, 32 in the case of light duty vehicles. Alternatively, the caliper assembly can be provided on the front wheels 30 to supplement motor-driven EPB systems provided on the rear wheels 32 in the case of medium duty or heavy duty vehicles.

In the present example, the caliper assembly 60 is shown on all four wheels 30, 32. With this in mind, the braking system 10 of the present invention can rely on sensed vehicle conditions to determine when service brake and/or parking brake actuation is desired. To this end, the control system 44 continuously monitors signals received from the sensors 48, 50, 52, 54 and controls the service brake and/or parking brake accordingly. One example of such service brake and/or parking brake operation can be found in co-pending U.S. patent application Ser. No. 17/374,423, filed Jul. 13, 2021, the entirety of which is incorporated by reference herein.

The caliper assemblies of the present invention are advantageous for several reasons. First, the cylindrical root surfaces of the spindle and piston threads allow the piston to move axially along the piston a predetermined amount without the spindle rotating. If, however, one or both pistons needs to move beyond the predetermine amount depending on the braking demand and/or pad wear, the spindle can rotate out of the way to accommodate this additional axial movement.

More specifically, the clutch mechanisms advantageously connecting the spindles to the adaptors (and ultimately the motor assembly) automatically disengage with the pistons require the additional travel. The clutch mechanisms also remain engaged during EPB braking to allow the motor assembly to deliver torque to the spindles and enable piston advance and retreat.

Furthermore, the clutch mechanisms are independent from one another and, thus, each piston assembly and associated spindle can independently account for brake pad and/or rotor wear. More specifically, the clutch mechanisms allow each spindle to "remember" the prior braking demand and/or brake pad wear and therefore begin each braking operation in the same rotational position relative to the associate piston as the prior braking operation ended. That said, the rotational positions of the spindles relative to one another can advantageously, automatically change over time.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A brake system for a wheel rotor having a brake pad associated therewith, comprising:
   a housing defining first and second passages;
   first and second pistons provided in the respective first and second passages for selectively moving the brake pad into engagement with the wheel rotor, each of the first and second pistons being associated with first threads separated by first cylindrical roots;
   first and second spindles each having second threads separated by second cylindrical roots and threadably engaged with the first threads associated with the respective first and second pistons such that the threads are axially movable along the opposing roots to allow the piston to move axially relative to the spindle without the spindle rotating; and
   first and second adapters coupled to the first and second spindles by respective clutch mechanisms, the clutch mechanisms having an engaged condition for transferring torque from the adaptors to the spindles and a disengaged condition allowing for relative rotation between each spindle and the associated adapter such that the spindle rotates when the piston moves axially relative to the spindle beyond a predetermined amount,
   wherein the pistons are axially movable relative to the spindles without the spindles rotating in response to hydraulic pressure applied to the pistons in order to move the brake pad into engagement with the wheel rotor.

2. The brake system of claim 1, wherein the first roots and the second roots have an axial length of 1.0 mm to 2.0 mm.

3. The brake system of claim 1, wherein each of the first and second threads includes a high efficiency side and a low efficiency side.

4. The brake system of claim 3, wherein the high efficiency sides have a flank angle greater than 45° and the low efficiency sides have a flank angle less than 45°.

5. The brake system of claim 1, wherein the clutch mechanism includes a spring that applies a biasing force to the spindle into engagement with the adapter.

6. The brake system of claim 1, wherein the pistons are independently axially movable relative to one another in response to hydraulic pressure applied thereto.

7. The brake system of claim 6, wherein the pistons adjust independently from one another in response to uneven pad wear on the brake pad.

8. The brake system of claim 1, further comprising first and second ball ramp assemblies for coupling each of the first and second spindles to the respective first and second pistons.

9. A brake system for a wheel rotor having a brake pad associated therewith, comprising:
   a housing defining first and second passages;
   first and second pistons provided in the respective first and second passages for selectively moving the brake pad into engagement with the wheel rotor, each of the first and second pistons being associated with first threads separated by first cylindrical roots;
   first and second spindles each having second threads separated by second cylindrical roots and threadably engaged with the first threads associated with the respective first and second pistons such that the threads are axially movable along the opposing roots to allow the piston to move axially relative to the spindle without the spindle rotating;
   first and second adapters coupled to the first and second spindles by respective clutch mechanisms, the clutch mechanisms having an engaged condition for transferring torque from the adaptors to the spindles and a disengaged condition allowing for relative rotation between each spindle and the associated adapter such that the spindle rotates when the piston moves axially relative to the spindle beyond a predetermined amount; and
   first and second ball ramp assemblies for coupling each of the first and second spindles to the respective first and second pistons.

10. The brake system of claim 9, wherein each of the first and second threads includes a high efficiency side and a low efficiency side.

11. The brake system of claim 10, wherein the high efficiency sides have a flank angle greater than 45° and the low efficiency sides have a flank angle less than 45°.

12. The brake system of claim 9, wherein the clutch mechanism includes a spring that applies a biasing force to the spindle into engagement with the adapter.

* * * * *